United States Patent
Watanabe

(10) Patent No.: US 7,249,898 B2
(45) Date of Patent: Jul. 31, 2007

(54) FUNCTION CONTROL METHOD FOR CAMERA

(75) Inventor: Gaku Watanabe, Tokyo (JP)

(73) Assignee: Canon Kabushiki Kaisha, Ohta-ku, Tokyo (JP)

( * ) Notice: Subject to any disclaimer, the term of this patent is extended or adjusted under 35 U.S.C. 154(b) by 1006 days.

(21) Appl. No.: 10/322,690

(22) Filed: Dec. 18, 2002

(65) Prior Publication Data

US 2003/0117657 A1 Jun. 26, 2003

(30) Foreign Application Priority Data

Dec. 21, 2001 (JP) .............................. 2001-390531

(51) Int. Cl.
*G03B 17/00* (2006.01)
(52) U.S. Cl. .................................... 396/439; 348/231.6
(58) Field of Classification Search ................ 396/287, 396/300, 439; 348/207.11, 231.6, 333.01, 348/231.3
See application file for complete search history.

(56) References Cited

U.S. PATENT DOCUMENTS 6,006,039 A * 12/1999 Steinberg et al. ............. 396/57

2001/0022617 A1 9/2001 Takaba et al.
2001/0044848 A1 11/2001 Kikuchi et al. ............. 709/229

FOREIGN PATENT DOCUMENTS

| CN | 132507 | 5/2001 |
| JP | 11-39804 | 2/1999 |
| JP | 2001-268500 | 9/2001 |
| WO | 01/01669 A1 | 1/2001 |

OTHER PUBLICATIONS

Korean Office Action, Mar. 30, 2005.
Chinese Office Action—Dec. 10, 2004.
Chinese Search Report Dec. 10, 2004.

* cited by examiner

*Primary Examiner*—W. B. Perkey
(74) *Attorney, Agent, or Firm*—Morgan & Finnegan, L.L.P.

(57) ABSTRACT

In a camera which obtains a still image and/or a moving image, at least a part of functions of the camera are previously restricted. To lift the restrictions, an operation restriction code (key data) is used. An externally inputted code and the operation restriction code are compared with each other, and if the input data and the operation restriction code correspond with each other, the restrictions of the functions are lifted.

6 Claims, 8 Drawing Sheets

FIG. 3

| BYTE | CONTENT OF RESTRICTION |
|---|---|
| 0 | WAY OF LIFTING OPERATION RESTRICTION CODE<br>0 : BY CAMERA OPERATION MEMBER<br>1 : BY COMMUNICATION WITH EXTERNAL DEVICE |
| 1 | LIFT CODE   ULALL<br>0 : FACTORY-CONFIGURED STATUS |
| 2 | FUNCTION RESTRICTION STATUS   STLF |

| | |
|---|---|
| 10 | FUNCTION RESTRICTION CHANGE CODE   ULF0<br>0 : FACTORY-CONFIGURED STATUS |
| ⋮ | ⋮ |
| 16 | FUNCTION RESTRICTION CHANGE CODE   ULF6<br>0 : FACTORY-CONFIGURED STATUS |

FIG. 4

| FUNCTION RESTRICTION CODE | STLF BYTE | CONTENT OF RESTRICTED FUNCTION |
|---|---|---|
| UL0 | 0 | LCD VIEW FINDER FUNCTION<br>0 : ENABLED<br>1 : DISABLED |
| UL1 | 1 | MOVING IMAGE RECORDING<br>0 : ENABLED<br>1 : DISABLED |
| UL2 | 2 | IMAGE RECORDING SIZE<br>0 : MAXIMUM RECORDING SIZE<br>1 : RESTRICTED RECORDING SIZE |
| UL3 | 3 | RECORDING OF IMAGE SENSING TIME<br>0 : ENABLED<br>1 : DISABLED |
| UL4 | 4 | RECORDABLE DATA AMOUNT   DENQ<br>0 : UNRESTRICTED |
| UL5 | 5 | RECORDABLE TIME   TEN<br>0 : UNRESTRICTED |
| UL6 | 6 | REPRODUCTION OPERATION<br>0 : ENABLED<br>1 : DISABLED |
| UL7 | 7 | COMMUNICATION OPERATION<br>0 : ENABLED<br>1 : DISABLED |

FUNCTION CONTROL METHOD FOR CAMERA

FIELD OF THE INVENTION

The present invention relates to a camera and its control method, and more particularly, to function control method for camera.

BACKGROUND OF THE INVENTION

In a digital camera which is convenient in that an image obtained by image sensing is freely deleted or a particular image is selected and printed out, thereby image sensing cost is reduced, is becoming popular. A low-price digital camera is realized by omitting a part of functions, i.e., a flash lamp or removable recording medium. In comparison with a high-price digital camera, the low-price camera cannot provide sufficient image sensing quality.

To improve image quality, it is necessary to install an expensive lens and high-speed image processor in a digital camera, and thus, there is a limit to reduction of production cost with maintained image quality. Further, as a digital camera has no consumable part, the production cost cannot be compensated by earnings of such consumable part.

SUMMARY OF THE INVENTION

The present invention has been made in consideration of the above situation, and has its object to provide a high-quality camera to consumers at a lower price.

According to the present invention, the foregoing object is attained by providing a camera comprising:

(A) a function restriction device adapted to restrict a part of a function of the camera; and (B) an input device adapted to input predetermined data for lifting the restriction from outside.

According to the present invention, the foregoing object is also attained by providing a camera comprising:

(A) a display device adapted to display an advertisement; and (B) a function restriction device adapted to restrict at least a part of a function of the camera, wherein an operation of the function restriction device and display of the advertisement on the display device are related to each other.

Further, the foregoing object is also attained by providing a control method of a camera comprising; restricting a part of a function of the camera and lifting the restriction in response to input of predetermined data from outside.

Furthermore, the foregoing object is also attained by providing a control method of a camera capable of displaying an advertisement comprising; restricting at least a part of a function of the camera and relating an operation of the function restriction device and display of the advertisement to each other.

Further, the foregoing object is also attained by providing a computer control program for a camera comprising; restricting a part of a function of the camera and lifting the restriction in response to input of predetermined data from outside.

Further, the forgoing object is also attained by providing a computer control program for a camera capable of displaying an advertisement comprising; restricting at least a part of a function of the camera and relating an operation of the function restriction device and display of the advertisement to each other.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a table showing an example of operation restriction code according to the first embodiment;

FIG. 4 is a table showing an example of function restriction status code according to the first embodiment;

DETAILED DESCRIPTION OF THE PREFERRED EMBODIMENTS

Preferred embodiments of the present invention will be described in detail in accordance with the accompanying drawings.

First Embodiment

Figure 1:
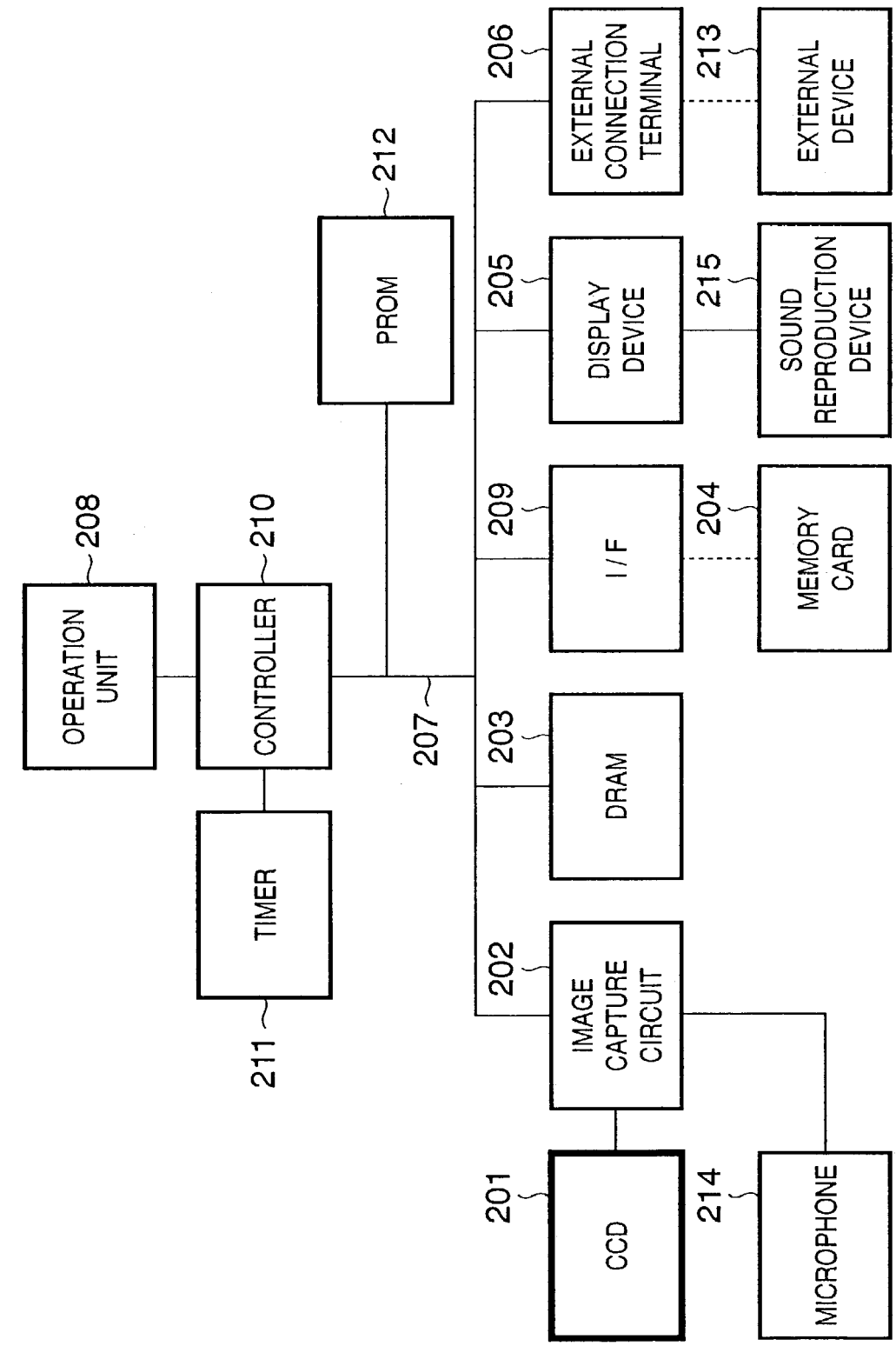
FIG. 1 is a block diagram showing the construction of a camera according to a first embodiment of the present invention.

FIG. 1 is a block diagram showing the construction of a camera according to a first embodiment of the present invention.

In FIG. 1, reference numeral 201 denotes an image sensing device such as a CCD; 202, an image capture circuit; 214, a microphone which inputs sound data; 203, a memory such as a DRAM for storing an image signal outputted from the image capture circuit 202; 204, a memory card; and 209, a memory card interface (MC I/F) for connection with the memory card 204.

Further, numeral 205 denotes a display device such as a color liquid crystal display device which displays an image obtained by the image sensing device 201; 215, a sound reproduction device connected to the display device 205; 206, an external connection terminal; and 213, an external device.

Further, numeral 208 denotes an operation unit; 210, a controller which controls the overall camera; 211, a timer; and 212, a program ROM (PROM) for storing programs. Numeral 207 denotes a data bus through which the controller 210 and other respective elements of the camera are connected for transmission/reception of data and control signal.

Next, an operation of the camera having the above construction according to the first embodiment will be described with reference to the flowchart of FIG. 2.

First, at step S101, when a button provided on the operation unit 208 of the camera is depressed, the controller 210 detects the depression of the button, and starts the camera. Hereinbelow, the controller 210 controls the operation of the camera in accordance with a program previously stored in the PROM 212. Note that it may be arranged such that the entire or part of the program is stored in the memory card 204.

Next, at step S102, the controller 210 performs communication with the PROM 212 and the memory card 204, and searches for an operation restriction code previously stored in the PROM 212 or the memory card 204. The operation restriction code will be described in detail later with reference to FIGS. 3 and 4. The operation restriction code may be recorded in any of the PROM 212 and the memory card 204. Further, the operation restriction code may be encoded by using predetermined encoder. In such case, the controller 210 decodes the operation restriction code by using predetermined decoder.

Upon search for operation restriction code, the controller 210 performs communication through the MC I/F 209 with the memory card 204. As the memory card 204 is removable from the MC I/F 209, when the memory card 204 is removed, the MC I/F 209 notifies the controller 210 of absence of the memory card 204.

At step S103, if it is determined that an operation restriction code has been obtained at step S102, the controller 210 decodes the operation restriction code. On the other hand, if there is no operation restriction, i.e., if it is determined that an operation restriction code has not been obtained or if the operation restriction code does not have any code indicating an operation restriction, the process proceeds to step S104. If there is an operation restriction, the process proceeds to step S105.

At step S104, image sensing, reproduction and communication operation can be performed in response to an operation of the operation unit by a user without operation restriction. The image sensing operation and the reproduction operation can be simultaneously performed, or one of the operations may be disabled when image sensing or reproduction is performed. Hereinbelow, the respective image sensing, reproduction and communication operations will be described.

<Image Sensing Operation>

When the user selects the image sensing operation, the controller 210 controls the image capture circuit 202, and displays an image obtained by the image sensing device 201 as a moving image on the display device 205, so that the user can use the display device 205 as an image view finder. The image capture circuit 202 may have optical lens driver, focus controller and aperture driver in accordance with necessity. The controller 210 controls these means in accordance with necessity and inputs an image.

In this state, if the user designates recording of still image or moving image by using the operation unit 208, the controller 210 writes an image signal outputted from the image capture circuit 202 into the DRAM 203. The resolution or size of the image outputted from the image capture circuit 202 is controlled by the controller 210 in correspondence with settings designated in the PROM 212. The image is compressed in the JPEG or MPEG format and is written into the DRAM 203. When a moving image is recorded, the image capture circuit 202 receives sound data from the microphone 214 connected thereto and adds the sound data to the moving image data.

Further, the controller 210 obtains current time data from the timer 211 and adds the time data to the compressed image data written in the DRAM 203. The controller 210 writes the data through the MC I/F 209, as a still image having, e.g., horizontal 2048 pixels×vertical 1560 pixels or a moving image having, e.g., horizontal 640 pixels×vertical 480 pixels, into the memory card 204.

Every time the controller 210 writes image data into the memory card 204, it acquires the remaining capacity of the memory card 204, and checks the amount of image data currently recorded on the memory card 204 and the recordable data amount.

<Reproduction Operation>

When the user selects the reproduction operation by the operation unit 208, the controller 210 reads image data from the memory card 204 through the MC I/F 209. If the read image data is compressed in the JPEG or MPEG format, it is decompressed and displayed on the display device 205. If sound data is added to the read image data, the sound data is reproduced by the sound reproduction device 215 connected to the display device 205.

<Communication Operation>

The user connects the external device 213 to the external connection terminal 206 and instructs to transmit image data using the operation unit 208, and the image data written in the memory card 204 or PROM 212 can be transmitted to the external device 213.

Figure 2:
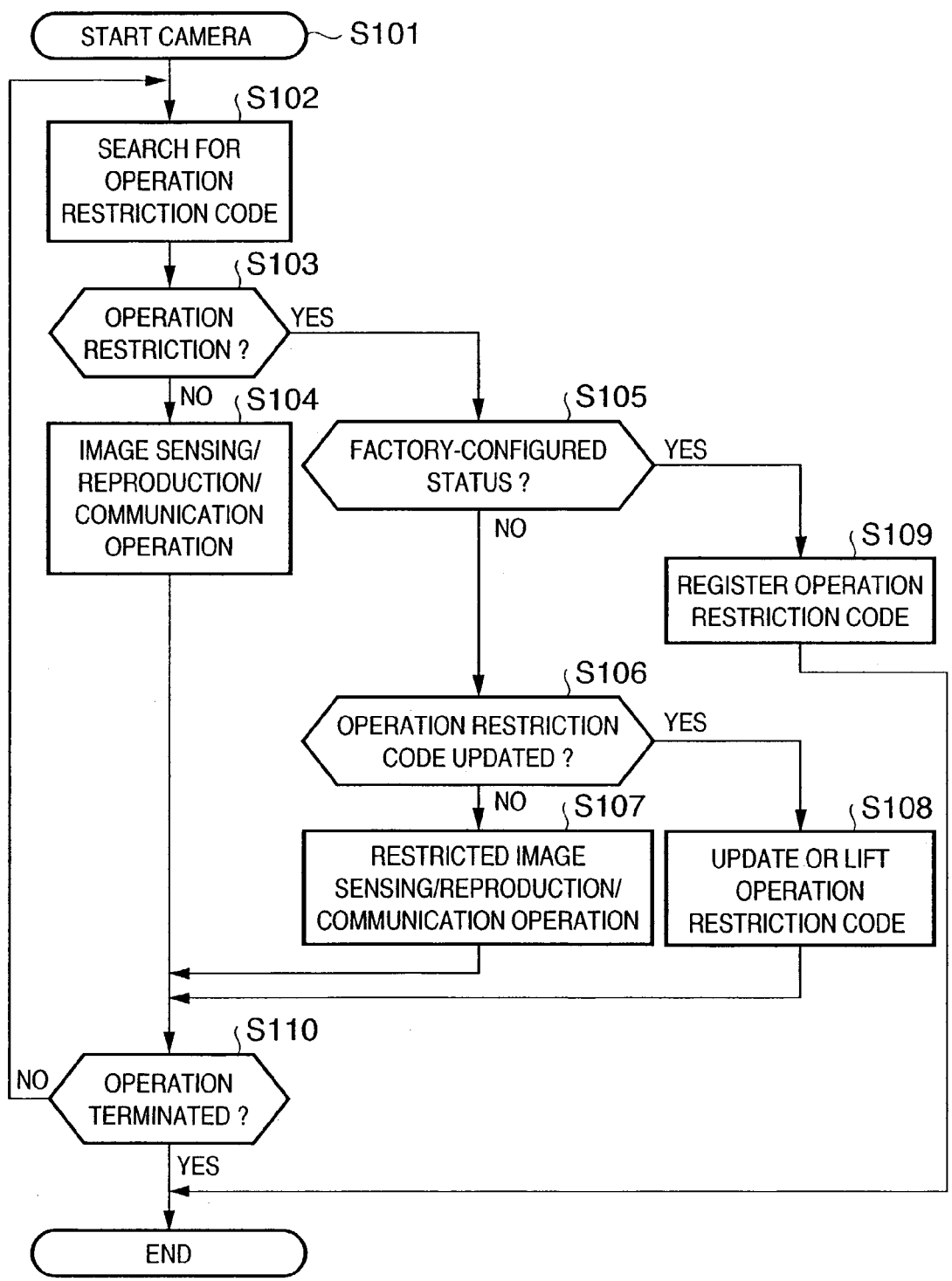
FIG. 2 is a flowchart showing the operation of the camera according to the first embodiment.

Returning to the control in FIG. 2, at step S103, if it is determined that there is an operation restriction, the process proceeds to step S105.

Next, the operation restriction code will be described. FIG. 3 shows an example of the operation restriction code. The operation restriction code (key data) in FIG. 3, which is 16 byte data, includes the following data.

way of lifting operation restriction code
lift code (for all the functions) ULALL
function restriction status STLF
function restriction change codes ULF0-ULF6

FIG. 4 shows an example of types of the above function restriction status STLF. The function restriction status STLF includes 8 types of data (UL0 to UL7), i.e., data indicating that use of LCD view finder function is enabled/disabled (UL0), data indicating that moving image recording is enabled/disabled (UL1), a data indicating image recording size (UL2), data indicating that recording of image sensing time is enabled/disabled (UL3), a recordable data amount (UL4), recordable time (UL5), data indicating that the reproduction operation is enabled/disabled (UL6), and data indicating that the communication operation is enabled/disabled (UL7).

At step S105, it is determined whether or not the lift code ULALL of the operation restriction code decoded at step S103 is in the factory-configured status. In the factory-configured status, the lift code ULALL is "0" and all the restrictable functions (UL0 to UL7) are restricted by the function restriction status STLF. If it is determined that the lift code is in the factory-configured status, i.e., the lift code ULALL=0 holds, the process proceeds to step S109, while if it is determined that the lift code is not in the factory-configured status, i.e., ULALL≠0, the process proceeds to step S106.

At step S106, the controller 210 displays a menu to update the operation restriction code or lift the restriction on the display device 205 in accordance with a program previously recorded in the PROM 212. The user performs an operation in accordance with the displayed procedure. If the user selects not to update/lift the operation restriction code, the process proceeds to step S107, while if the user updates/lifts the restriction, the process proceeds to step S108.

At step S107, the image sensing, reproduction and communication operations with restrictions are performed in correspondence with settings of the operation restriction code. The respective image sensing, reproduction and communication operations with operation restrictions will be described hereinbelow. The image sensing, reproduction and communication operations are performed in correspondence with the user's operation at the operation unit 208. The image sensing operation and the reproduction operation may be simultaneously performed, or the image sensing or reproduction operation may be disabled while the other operation is performed.

In the respective operations, the controller 210 reads the function restriction status STLF in Byte 2 of the operation restriction code in FIG. 3 recorded in the memory card 204 or the PROM 212, and performs the operations while always referring to the function restriction status STLF. As described above, the function restriction status STLF indicates the settings of the restrictable operations in the present camera as shown in FIG. 4.

<Restricted Image Sensing Operation>

If the user selects the image sensing operation, the controller 210 obtains image sensing start time TCAPSTA from the timer 211. Further, the controller 210 controls the image capture circuit 202 and displays an image obtained by the image sensing device 201, as a moving image, on the display device 205, thereby the user can use the display device 205 as an image view finder. However, if the LCD view finder function UL0, set in Byte 0 of the function restriction status STLF, is "1", the view finder function is disabled. Note that the image capture circuit 202 may have an optical lens driver, focus controller and aperture driver in accordance with necessity. The controller 210 controls these units in accordance with necessity and inputs an image.

Upon image sensing operation, the controller 210 periodically obtains current time TNOW from the timer 211. At the same time, the controller reads the recordable time UL5 set in Byte 5 of the function restriction status STLF in FIG. 4. If TEN indicating the recordable time is set, the controller compares the recordable time TEN, the image sensing start time TCAPSTA and the current time TNOW. If TNOW>TCAPSTA+TEN holds, the controller 210 notifies the user of the lapse of restricted time by the display device 205, and terminates the operation. If the recordable time TEN=0 holds, the image sensing time is not restricted.

In the first embodiment, only the time elapsed from the start of the camera is restricted, however, the total camera use time may be restricted by recording the image sensing start time TCAPSTA into the PROM 212 only when the camera has first started. Further, the reproduction operation may be similarly restricted.

In this status, the user designates recording of still image or moving image by using the operation unit 208. If moving image recording is designated, the controller 210 checks the moving image recording UL1 of the function restriction status STLF. If the moving image recording UL1 is "1" (disabled), the controller 210 notifies the user that the moving image recording is disabled by using e.g. the display device 205.

If still image recording is designated or moving image recording is designated when moving image recording UL1=0 (enabled) holds, the controller 210 writes an image signal outputted from the image capture circuit 202 into the DRAM 203. The resolution or size of the image outputted from the image capture circuit 202 is controlled by the controller 210 in correspondence with settings designated in the PROM 212. The image is compressed in the JPEG or MPEG format and is written into the DRAM. When a moving image is recorded, the image capture circuit 202 receives sound data from the microphone 214 connected thereto and adds the sound data to the moving image data.

The controller 210 checks the status of recording of image sensing time UL3 indicated in Byte 3 of the function restriction status STLF. If the recording of image sensing time UL3 is "0" (enabled), the controller obtains current time data from the timer 211 and adds the time data to the compressed image data written in the DRAM 203, and writes the data through the MC I/F 209 into the memory card 204 in accordance with necessity.

On the other hand, recording of image sensing time UL3=1 (disabled) holds, the time data is not added to the image data written into the memory card 204.

Further, the controller 210 checks the image recording size UL2 indicated in Byte 2 of the function restriction status STLF. If UL2=0, the controller 210 writes the data as a still image having, e.g., horizontal 2048 pixels×vertical 1560 pixels or a moving image having, e.g., horizontal 640 pixels×vertical 480 pixels, into the memory card 204.

On the other hand, if UL2=1 holds as the image recording size, the controller 210 records the data in a restricted recording size. For example, the controller writes the data, as a still image having horizontal 640 pixels×vertical 480 pixels or a moving image having horizontal 160 pixels×vertical 120 pixels, into the memory card 204.

Every time the controller 210 writes the image data into the memory card 204, it checks the remaining capacity of the memory card 204, and checks an amount CDQ of image data currently recorded on the memory card 204 and a recordable data amount CDEQ.

If the recordable data amount UL4 in Byte 4 of the function restriction status STLF is not "0" but DENQ, the controller 210 compares the amount DENQ with the above amount CDQ, and stops the image sensing operation when DENQ<CDQ holds.

<Restricted Reproduction Operation>

If the user selects the reproduction operation by using the operation unit 208, the controller 210 reads image data from the memory card 204 through the MC I/F 209.

Note that the controller 210 does not perform the reproduction operation if the reproduction operation UL6 in Byte 6 of the function restriction status STLF is "1" (disabled).

If the read image data is compressed in, e.g., the JPEG or MPEG format, the controller decompresses the image data, and displays the data on the display device 205. If sound data is added to the read image data, the controller reproduces the sound data by the sound reproduction device 215 connected to the display device 205.

<Restricted Communication Operation>

The user connects the external device to the external connection terminal 206 such that the user transmits the image data written in the memory card 204 or PROM 212 to the external device by sending an instruction from the operation unit 208. Note that if the communication operation UL7 indicated in Byte 7 of the function restriction status STLF is "1" (disabled), the controller 210 does not perform communication.

Returning to FIG. 2, at step S108, update/lifting of operation restriction code is performed. The update/lifting of operation restriction code is made by two methods, and one of them is recorded in the operation restriction code previously recorded in the PROM 212 or the memory card 204.

As shown in FIG. 3, Byte 0 of the operation restriction code indicates the method for lifting the operation restriction code. If Byte 0=0 holds, the controller 210 requires through the display device 205 the user's inputting the lift code. The user inputs the lift code by using the operation unit 208. The controller 210 compares the input code with the lift code ULALL indicated in Byte 1 of the operation restriction code recorded in the PROM 212, and if the codes correspond with each other, the controller deletes the operation restriction code.

If the codes do not correspond with each other, the controller compares the input code with the function restriction change codes ULF0 to ULF6 which start from Byte 10. If a corresponding code is found, the controller updates the function restriction status STLF recorded in the Byte 2 of the operation restriction code. As described above, the function restriction status STLF includes information on restricted functions of the camera. For example, if the input code corresponds with ULF0, the restriction of the Byte 0 of the STLF is lifted.

Further, if Byte 0 of the operation restriction code is "1", the controller 210 requires through the display device 205 the user's connecting the external device 213 to the external connection terminal. When the controller 210 detects that the external device 213 has been connected to the external connection terminal 206, the controller performs communication with the external device 213, and receives a lift code equivalent to the code inputted by the user when Byte 0=0 held or function restriction lift code from the external device 213. The controller 210 performs function restriction lifting similar to that when Byte 0=0 held by using the received code.

Further, if it is determined at step S105 that the lift code ULALL is in the factory-configured status, the operation restriction code is registered at step S109.

As described above, if the lift code ULALL of the operation restriction code is "0", the camera is in the factory-configured status.

At this time, in accordance with the program previously written in the PROM 212, the camera displays a request for input of lift code and function restriction code on the display device 205.

The user of the camera at this time is e.g. a camera seller. The above input request is made only when ULALL is "0".

The camera seller selects functions to be restricted, and writes the lift code ULALL and necessary function restriction change codes ULF0 to ULF6 by using the operation unit 208. Regarding functions not to be restricted, it is not necessary to input corresponding function restriction change codes.

The controller 210 rewrites the function restriction status STLF so as to restrict the functions corresponding to the input function restriction change codes.

At step S110, when termination of operation is designated by the operation unit 208, the controller 210 stops the operation of the camera. To continue the image sensing or reproduction operation, the process returns to step S102.

Further, in a case where the number of recorded images has exceeded the number of recordable images previously designated in the PROM 212, when the storable data amount becomes less than a threshold value previously recorded in the PROM 212, the controller 210 terminates the image sensing operation.

Further, it may be arranged such that if the controller 210 has detected reduction of driving power, temperature or the like by its auxiliary sensor, the controller 210 displays the detected status on the display device 205, and terminates the image sensing operation in accordance with necessity.

Figure 5:
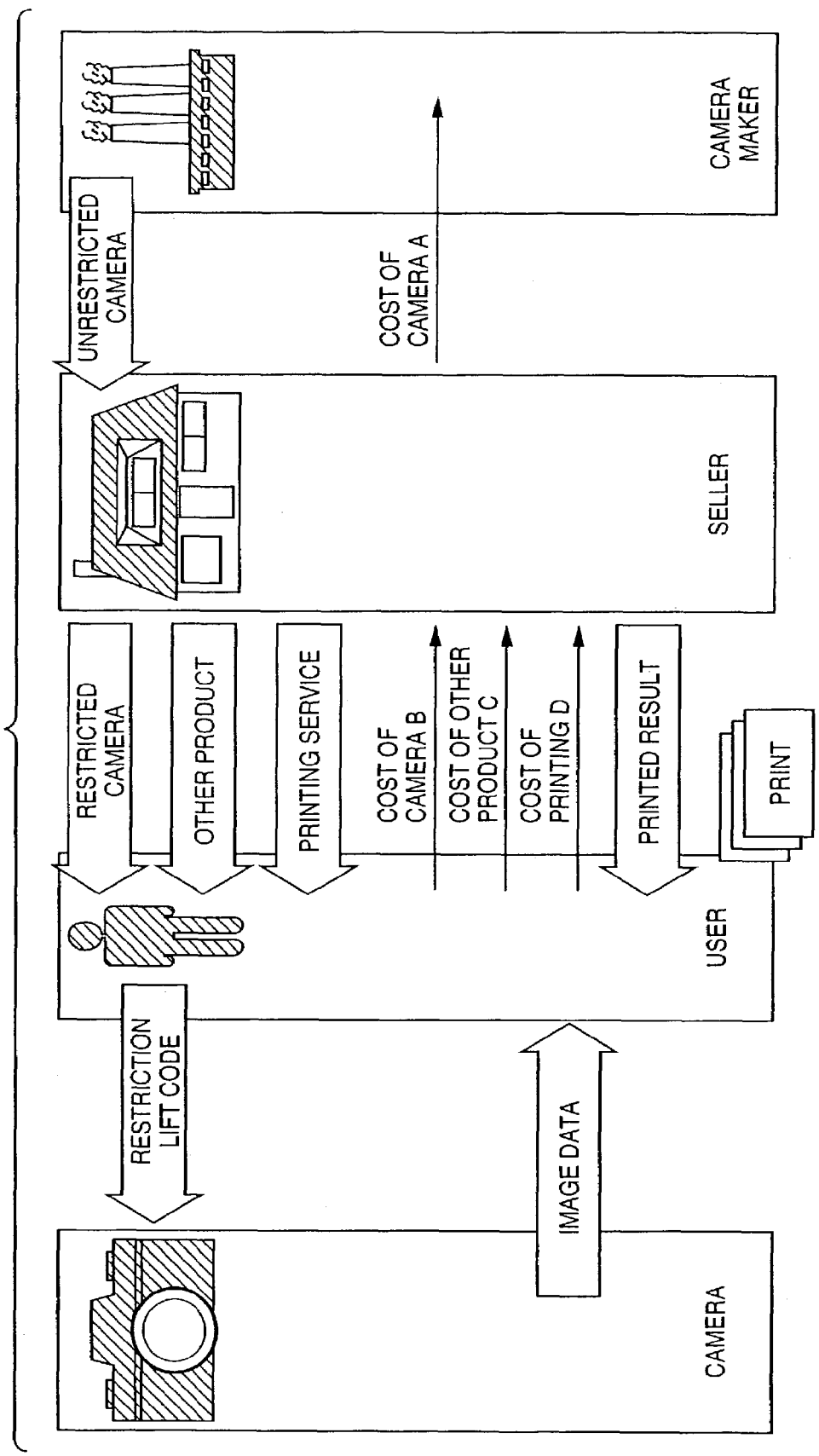
FIG. 5 is an explanatory view showing an example of use of the camera according to the first embodiment.

Regarding the above-described camera, charging can be made by the following method as shown in FIG. 5.

First, a camera maker delivers the camera to the camera seller at a price A.

The camera seller sets function restrictions on the camera in factory-configured status as described at step S109. The user purchases the camera from the camera seller at a price B. Assuming that A>B holds, the camera seller bears the cost A−B. At this time, the functions of the camera are restricted.

The user can obtain a code to lift the above operation restrictions by purchasing another product at a price C from the camera seller and/or obtaining a print service at a price D.

For example, it may be arranged such that the lift code can be obtained by connecting the camera of the first embodiment to a print service device at the store of the camera seller. Further, in a case where the user orders printing via the Internet, the lift code may be obtained on the Internet and inputted by utilizing the operation unit of the camera.

The camera seller can offset the cost A−B by making a profit equal to or more than the cost A−B by the sale of the other product or particular service.

As a result of the above system, the camera seller can lower the price of the camera, and the user can purchase a high-performance camera at the cost of purchase of the other product/service. The present invention is particularly advantageous in a case where the service provided by the camera seller is image printing.

Note that in the above-described first embodiment, the camera operations are restricted by the operation restriction code, however, the operation restriction code may be replaced with any operation enable code. It may be arranged such that the operations are enabled when the operation enable codes exist.

Second Embodiment

Next, a second embodiment of the present invention will be described. Note that as the construction of the camera of the second embodiment is the same as that of the first embodiment described with reference to FIG. 1, the explanation of the construction will be omitted.

Figure 6:
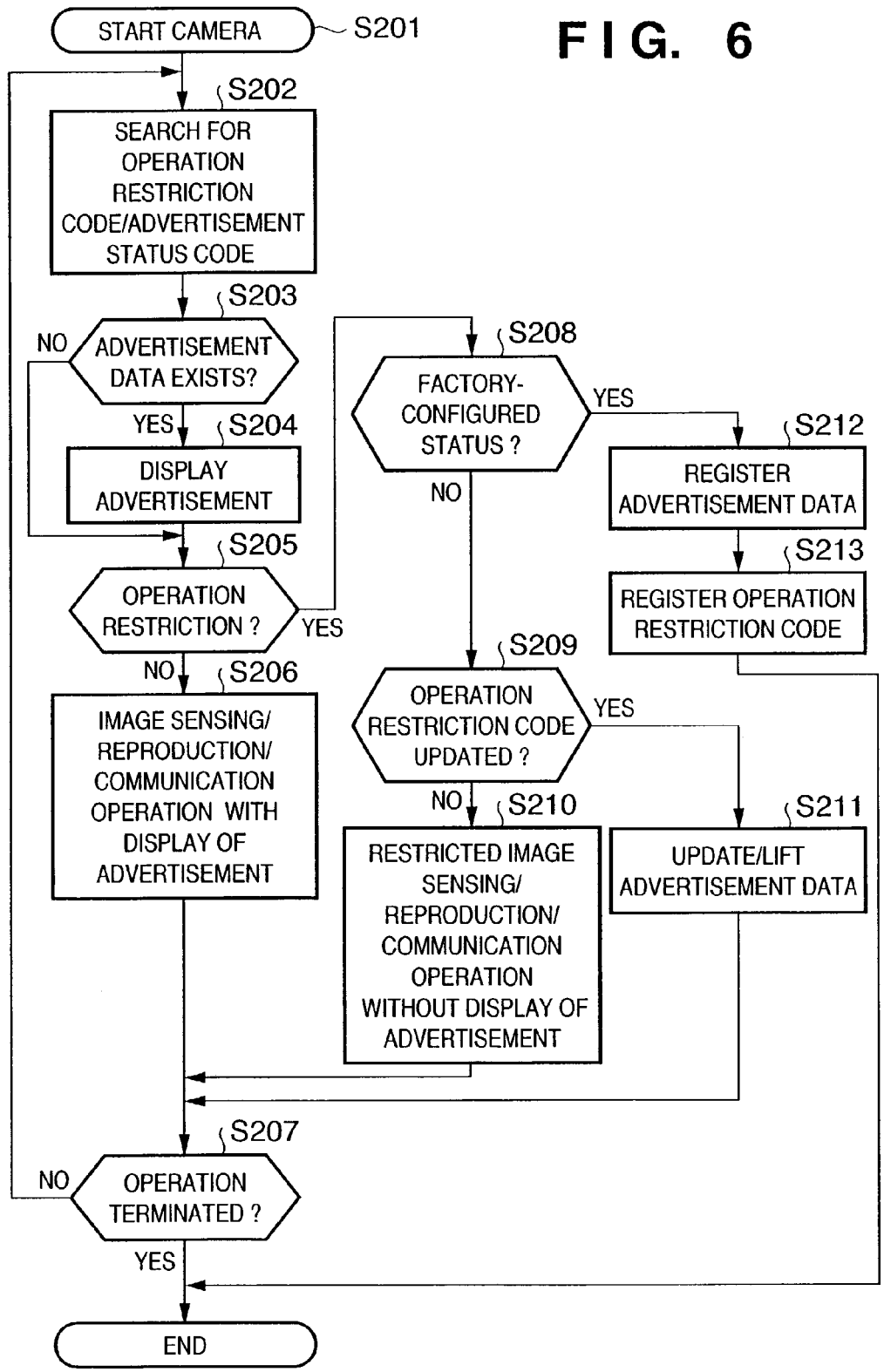
FIG. 6 is a flowchart showing the operation of the camera according to a second embodiment of the present invention.

FIG. 6 is a flowchart showing the operation of the camera according to the second embodiment.

First, at step S201, when the button provided on the operation unit 208 of the camera is depressed, the controller 210 detects the depression of the button, and starts the camera. Hereinbelow, the controller 210 controls the operation of the camera in accordance with a program previously stored in the PROM 212. Note that it may be arranged such that the entire or part of the program is stored in the memory card 204.

Next, at step S202, the controller 210 performs communication with the PROM 212 and the memory card 204, and searches for the operation restriction code and an advertisement status code previously stored in the PROM 212 or the memory card 204. The operation restriction code has been described above with reference to FIGS. 3 and 4. The advertisement status code includes a method for changing advertisement data, an advertisement data file name, an advertisement data authentication code and an advertisement data validity term. The advertisement data is still image data or moving image data including audio data. The details of the advertisement status code will be described later with reference to FIG. 7. The operation restriction code and the advertisement status code may be recorded in any of the PROM 212 and the memory card 204. Further, the operation restriction code and the advertisement status code may be encoded by using predetermined encoder. In such case, the controller 210 decodes the operation restriction code by using predetermined decoder.

Upon search for an operation restriction code and an advertisement status code, the controller 210 performs communication through the MC I/F 209 with the memory card 204. As the memory card 204 is removable from the MC I/F 209, when the memory card 204 is removed, the MC I/F 209 notifies the controller 210 of absence of the memory card 204.

If advertisement data exists (YES at step S203), the controller 210 displays the advertisement data on the display device 205 at step S204. By this operation, the user feels as if the advertisement data is displayed when the camera is started. If no advertisement data exists, the process proceeds to step S205.

Next, at step S205, if an operation restriction code has been obtained at step S202, the controller 210 decodes the operation restriction code. On the other hand, if there is no operation restriction, i.e., if an operation restriction code has not been obtained and if the operation restriction code does not have any code indicating operation restriction, the process proceeds to step S206. If there is an operation restriction, the process proceeds to step S208. Note that even in a case where there is no operation restriction, if no advertisement status code has been detected, the process proceeds to step S208.

The controller 210 reads the authentication code of the advertisement data included in the advertisement status code and compares it with the advertisement data. The authentication code of the advertisement data, corresponding to the advertisement data, is, e.g., a prime number with which initial several ten bytes of the advertisement data can be divided out. If an error occurs in this comparison, it is determined that the advertisement data has been falsified, and the process proceeds to step S208. If there is no file corresponding to the advertisement data file name included in the advertisement status code, the process also proceeds to step S208. At this time, the controller 210 updates the operation restriction code so as to validate all the restrictions of the operation restriction code.

Next, the controller 210 compares the advertisement data validity term included in the advertisement status code with current time of the timer 211. If the current time exceeds the validity term, the controller 210 updates the operation restriction code so as to validate all the restrictions of the operation restriction code, and performs the operation at step S208.

At step S206, the image sensing/reproduction/communication operations with display of advertisement are performed by the user's operation at the operation unit 208. These operations may be simultaneously performed, or one of the operations may be performed while the other operations are disabled. Hereinbelow, the respective image sensing, reproduction and communication operations with display of advertisement at step S206 will be described.

<Image Sensing Operation with Display of Advertisement>

When the user selects the image sensing operation, the controller 210 controls the image capture circuit 202, and displays an image obtained by the image sensing device 201 as a moving image on the display device 205, so that the user can use the display device 205 as an image view finder. The image capture circuit 202 may have optical lens driver, focus controller and aperture driver in accordance with necessity. The controller 210 controls these units in accordance with necessity and inputs an image.

Note that the user can designate from the operation unit 208 as to whether or not the display device 205 is to be utilized as an image view finder. If the user designates that the image sensing finder is enabled, the controller 210 displays the advertisement data upon start of the finder display.

Further, when the user designates termination of the finder display, the controller 210 displays the advertisement data.

It may be arranged such that the controller 210 measures time where the image sensing operation is not performed by the timer 211 and periodically displays the advertisement data in such time, in addition to upon turning ON/OFF of the finder. In this case, if image sensing and recording operations are designated while the advertisement data is displayed, the recording operation is performed prior to the display of the advertisement data.

In this state, if the user designates recording of a still image or a moving image by using the operation unit 208, the controller 210 writes an image signal outputted from the image capture circuit 202 into the DRAM 203. The resolution or size of the image outputted from the image capture circuit 202 is controlled by the controller 210 in correspondence with settings designated in the PROM 212. The image is compressed in the JPEG or MPEG format and is written into the DRAM. When a moving image is recorded, the image capture circuit 202 receives sound data from the microphone 214 connected thereto and adds the sound data to the moving image data.

Further, the controller 210 obtains current time data from the timer 211 and adds the time data to the compressed image data written in the DRAM 203. The controller 210 writes the data through the MC I/F 209, as a still image having, e.g., horizontal 2048 pixels×vertical 1560 pixels or a moving image having, e.g., horizontal 640 pixels×vertical 480 pixels, into the memory card 204. Note that the image data may be written into the PROM 212 in accordance with a predetermined program.

Every time the controller 210 writes the image data into the memory card 204, it checks the remaining capacity of the memory card 204, and checks the amount of image data currently recorded in the memory card 204 and the recordable data amount.

In a case where the speed of writing into the memory card 204 is low, it takes several seconds to several ten seconds to write the image. The controller 210 predicts this writing time, and if the writing time becomes equal to or longer than the predetermined period, the controller displays the advertisement data during the writing.

Generally, even in a case where the user designates the image sensing operation, a status where the camera cannot perform the image sensing operation occurs. For example, the camera is in such status upon writing to the memory card as above, strobe charging, image sensing by using a self timer, display of warning or the like. In such case, the advertisement data may be displayed.

<Reproduction Operation with Display of Advertisement>

When the user selects the reproduction operation by the operation unit 208, the controller 210 reads image data from the memory card 204 through the MC I/F 209. If the read image data is compressed in the JPEG or MPEG format, the controller 210 decompresses the image data, and displays the data on the display device 205. If sound data is added to the read image data, the controller reproduces the sound data by the sound reproduction device 215 connected to the display device 205.

The controller 210 displays the advertisement data on the display device 205 at previously designated timing. For example, every time when a predetermined number of recorded images are displayed, or at predetermined periods in reproduction, the advertisement data is displayed. Note that if the advertisement is displayed during reproduction of moving image, the moving image is temporarily stopped. At this time, the controller 210 displays a blank image (monochrome image of entire white, black or the like) for about 1 second before and after the display of the advertisement data such that the user can easily discriminate the recorded image from the advertisement data.

Note that in a case where the advertisement data and the recorded image data can be simultaneously displayed, they may be displayed on the same screen.

The user can perform automatic reproduction of recorded images in the camera sequentially or at random at predetermined intervals. The user may feel unpleasant if the advertisement data appears during the automatic reproduction operation, it may be arranged such that the display of advertisement data during the automatic reproduction is disabled and the advertisement is displayed upon start and end of the automatic reproduction, in accordance with a predetermined program.

<Communication Operation with Display of Advertisement>

The user connects the external device 213 to the external connection terminal 206 such that the image data written in the memory card 204 or PROM 212 is transmitted to the external device 213 by sending an instruction from the operation unit 208.

During the communication, the controller 210 displays the advertisement data on the display device 205 at previously designated timing. The timing is the same as that upon reproduction.

At step S207, when termination of operation is designated by the operation unit 208, the controller 210 stops the operation of the camera. To continue the image sensing/reproduction/communication operation, the process returns to step S202.

Further, in a case where the number of recorded images has exceeded the number of recordable images previously designated in the PROM 212, when the storable data amount becomes less than a threshold value previously recorded in the PROM 212, the controller 210 terminates the image sensing operation.

Further, it may be arranged such that if the controller 210 has detected reduction of driving power, temperature or the like by its auxiliary sensor, the controller 210 displays the detected status on the display device 205, and terminates the image sensing operation in accordance with necessity.

At step S208, it is checked whether or not the camera is in the factory-configured status. As the checking operation is the same as the operation at step S105 in the first embodiment, the explanation of it will be omitted. If the camera is in the factory-configured status, the process proceeds to step S212, while if the camera is not in the factory-configured status, the process proceeds to step S209.

At step S209, the controller 210 displays a menu to update the operation restriction code or lift the restriction on the display device 205 in accordance with a program previously recorded in the PROM 212. The user performs an operation in accordance with the displayed procedure. If the user selects not to update/lift the operation restriction code, the process proceeds to step S210, while if the user updates/lifts the restriction, the process proceeds to step S211.

At step S210, the image sensing, reproduction and communication operations with restrictions are performed in correspondence with settings of the operation restriction code. As the respective image sensing, reproduction and communication operations with operation restrictions are the same as those described at step S107 in FIG. 2, the explanations of the operations will be omitted. At this time, different from the image sensing and reproduction operations at step S206, the advertisement is not displayed in the image sensing and reproduction operations.

The image sensing operation and the reproduction operation may be simultaneously performed, or the image sensing or reproduction operation may be disabled while the other operation is performed.

At step S211, different from the first embodiment, the operation restriction can be lifted by updating the advertisement data. Further, it may be arranged such that the display of advertisement data is stopped and the camera operation restriction is enabled by deleting the advertisement data.

There are two ways of updating advertisement data, and one of these ways is recorded in the advertisement status code previously recorded in the PROM 212 or the memory card 204.

Figure 7:
FIG. 7 is a table showing an example of advertisement status code according to the second embodiment.

As shown in FIG. 7, the Byte 0 of the operation restriction code indicates the way of updating the advertisement data. If Byte 0 =0 holds, the controller 210 requires through the display device 205 the user's selection of advertisement data. The user selects an advertisement by using the operation unit 208.

Further, if Byte 0 =1 holds, the controller 210 requires through the display device 205 the user's connecting the camera with the external device 213. When the controller 210 detects that the external device 213 has been connected to the external connection terminal 206, the controller 210 performs communication with the external device 213. By this communication, the controller 210 receives new advertisement data and new advertisement status data from the external device 213, and writes the data into the memory card 204 or the PROM 212.

Note that it may be arranged such that the user writes the data, from any substitute device for the external device 213, into the memory card 204 or the PROM 212. Further, it may be arranged such that the external connection device 206 is not used but the data is directly written into the memory card 204 which is removed from the camera.

Further, if it is determined at step S208 that the camera is in the factory-configured status, the controller 210 registers the advertisement data at step S212 then registers the operation restriction code in accordance with a predetermined program at step S213.

Figure 8:
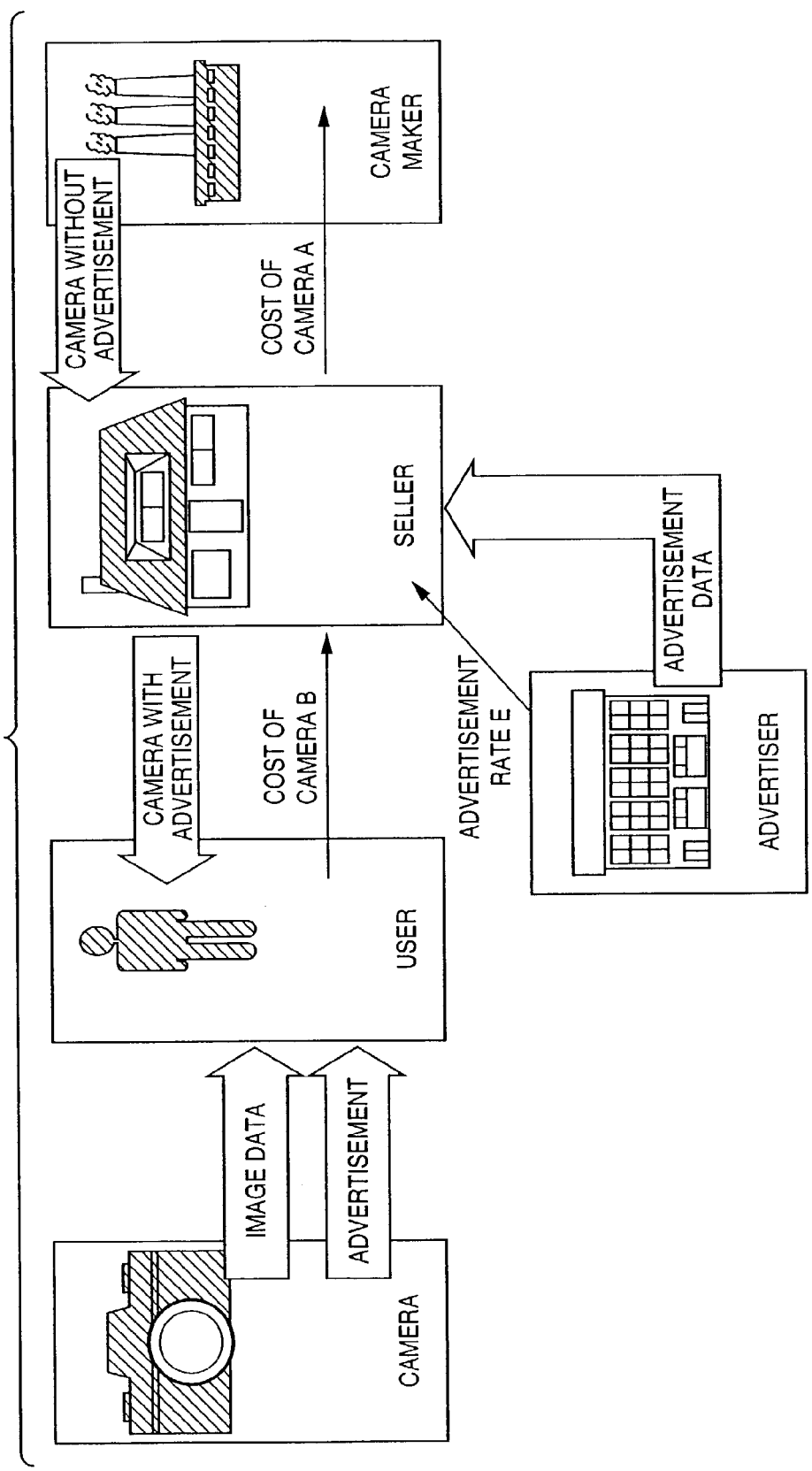
FIG. 8 is an explanatory view showing an example of use of the camera according to the second embodiment.

Regarding the above-described camera, charging can be made by a method as shown in FIG. 8.

First, the camera maker delivers the camera to the camera seller at a price A. The camera seller performs the operations at steps S212 and S213, thereby registers the advertisement data and the function restriction code into the camera in the factory-configured status. The user purchases the camera from the camera seller at a price B. If A>B holds, the camera seller bears the cost A−B.

The camera seller receives an advertisement rate E from an advertiser of the above registered advertisement data, to compensate the cost A−B.

The camera seller obtains a profit equal to or more than the cost A–B as an advertisement income, thereby the camera seller can offset the cost A–B.

As a result, the camera seller can lower the price of the camera, and the user can purchase a high-performance camera.

Other Embodiment

The present invention can be applied to a system constituted by a plurality of devices (e.g., a host computer, an interface, a camera head) or to an apparatus comprising a single device (e.g., electronic camera for sensing a moving image or a still image, a camera which uses a silver halide film).

Further, the object of the present invention can also be achieved by providing a storage medium holding software program code for performing the aforesaid processes to a computer system or an apparatus (e.g., a personal computer), reading the program code by a CPU or MPU of the computer system or apparatus from the storage medium, then executing the program.

In this case, the program code read from the storage medium realizes the functions according to the embodiments, and the storage medium holding the program code constitutes the invention.

Further, the storage medium, such as a floppy disk, a hard disk, an optical disk, a magneto-optical disk, a CD-ROM, a CD-R, a magnetic tape, a non-volatile type memory card, and a ROM, and a computer network such as LAN (local area network) and WAN (wide area network), can be used for providing the program code.

Furthermore, besides aforesaid functions according to the above embodiments are realized by executing the program code which is read by a computer, the present invention includes a case where an OS (operating system) or the like working on the computer performs a part or entire processing in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, a CPU or the like contained in the function expansion card or unit performs a part or entire processing in accordance with designations of the program code and realizes the functions of the above embodiments.

In a case where the present invention is applied to the aforesaid storage medium, the storage medium stores program code corresponding to the flowchart shown in FIG. 2 and the data shown in FIGS. 3 and 4, or the flowchart shown in FIG. 6 and the data shown in FIGS. 3, 4 and 7 described in the embodiments.

The present invention is not limited to the above embodiments and various changes and modifications can be made within the spirit and scope of the present invention. Therefore, to apprise the public of the scope of the present invention, the following claims are made.

What is claimed is:

1. A camera comprising:

a restriction code search unit adapted to search for an operation restriction code or codes in memory, said operation restriction codes respectively corresponding to different operations of said camera;

a release code obtaining unit adapted to obtain a release code;

a release unit adapted to release the operation restriction code, searched by said search unit, which corresponds to the release code obtained by said release code obtaining unit;

an updating unit adapted to update the operation restriction code or codes in the memory in accordance with the release code obtained by said release code obtaining unit; and a restriction unit adapted to disable an operation of said camera corresponding to each of said operation restriction code or codes searched by said restriction code search unit until said release unit releases each of said operation restriction code or codes searched by said restriction code search unit.

2. The camera according to claim 1, wherein the operations of said camera include at least one of an image sensing operation for controlling an image capture circuit to obtain image data and record the image data on a memory card, a playback operation for reading image data from the memory card and display the read image data on a display device, and a communication operation for transmitting the image data recorded on the memory card to an external apparatus.

3. The camera according to claim 1 further comprising:

an advertisement code obtaining unit adapted to obtain an advertisement code;

a control unit adapted to control to display an advertisement corresponding to the advertisement code obtained by said advertisement code obtaining unit and to disable said restriction unit to release the operation corresponding to each of the operation restriction code or codes searched by said restriction code search unit.

4. A control method of camera comprising:

searching for an operation restriction code or codes in memory, said operation restriction codes respectively corresponding to different operations of said camera;

disabling an operation of said camera corresponding to each of the searched operation restriction code or codes;

obtaining a release code;

releasing the searched operation restriction code which corresponds to the obtained release code;

updating the operation restriction code or codes in the memory in accordance with the obtained release code; and releasing the operation corresponding to the released operation restriction code.

5. A computer program product stored on a computer-readable memory medium and embodying a computer-executable program for implementing a method for controlling a camera, comprising:

searching for an operation restriction code or codes in memory, said operation restriction codes respectively corresponding to different operations of said camera;

disabling an operation of said camera corresponding to each of the searched operation restriction code or codes;

obtaining a release code;

releasing the searched operation restriction code, which corresponds to the obtained release code;

updating the operation restriction code or codes in the memory in accordance with the obtained release code; and releasing the operation corresponding to the released operation restriction code.

6. A computer readable storage medium on which is stored a computer program for making a camera execute a method of controlling, said program comprising:
- a searching step of searching for an operation restriction code or codes in memory, said operation restriction codes respectively corresponding to different operations of said camera;
- a disabling step of disabling an operation of said camera corresponding to each of the searched operation restriction code or codes;
- an obtaining step of obtaining a release code;
- a releasing step of releasing the searched operation restriction code, which corresponds to the obtained release code;
- an updating step of updating the operation restriction code or codes in the memory in accordance with the obtained release code; and
- a releasing step of releasing the operation corresponding to the released operation restriction code.

* * * * *